US007966367B2

United States Patent
Hsueh et al.

(10) Patent No.: US 7,966,367 B2
(45) Date of Patent: Jun. 21, 2011

(54) WEB APPLICATION EXECUTION METHOD (75) Inventors: Hsiang-Yuan Hsueh, Taipei County (TW); Yi-Bin Lin, Changhua County (TW); Jun-Bin Shi, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 275 days.

(21) Appl. No.: 12/426,670

(22) Filed: Apr. 20, 2009

(65) Prior Publication Data

US 2010/0169407 A1    Jul. 1, 2010

(30) Foreign Application Priority Data

Dec. 29, 2008 (TW) .............................. 97151203 A (51) Int. Cl.
  G06F 15/16 (2006.01)
  G06F 15/173 (2006.01)
(52) U.S. Cl. ...................................... 709/203; 709/224
(58) Field of Classification Search .................. 709/203, 709/224
  See application file for complete search history.

(56) References Cited

U.S. PATENT DOCUMENTS

| | | | |
|---|---|---|---|
| 6,493,758 B1 | 12/2002 | McLain | |
| 6,779,042 B1* | 8/2004 | Kloba et al. | 709/248 |
| 6,954,782 B2 | 10/2005 | Thurlow et al. | |
| 6,959,331 B1* | 10/2005 | Traversat et al. | 709/222 |
| 7,272,782 B2 | 9/2007 | Sneh | |
| 7,275,105 B2* | 9/2007 | Bloch et al. | 709/227 |
| 7,543,047 B2* | 6/2009 | Park et al. | 709/221 |
| 7,650,432 B2* | 1/2010 | Bosworth et al. | 709/248 |
| 7,685,253 B1* | 3/2010 | Valia | 709/217 |
| 7,814,234 B2* | 10/2010 | Hawkins et al. | 709/250 |
| 2003/0158947 A1* | 8/2003 | Bloch et al. | 709/227 |
| 2004/0205068 A1* | 10/2004 | Iyer et al. | 707/10 |
| 2006/0004923 A1* | 1/2006 | Cohen et al. | 709/228 |
| 2006/0004927 A1* | 1/2006 | Rehman et al. | 709/250 |
| 2007/0300243 A1* | 12/2007 | Gross et al. | 719/330 |
| 2008/0086540 A1* | 4/2008 | Scott et al. | 709/217 |
| 2008/0114720 A1* | 5/2008 | Smith et al. | 707/2 |
| 2008/0189439 A1* | 8/2008 | Chitre et al. | 709/248 |
| 2009/0094332 A1* | 4/2009 | Schemers et al. | 709/206 |

FOREIGN PATENT DOCUMENTS

| | | | |
|---|---|---|---|
| JP | 2010124349 A | * | 6/2010 |
| TW | 200602912 | | 1/2006 |
| TW | 200521748 | | 7/2006 |
| TW | 200741571 | | 11/2007 |

(Continued)

OTHER PUBLICATIONS

Ananthanaraynana, G. et al. "OWeB: A Framework for Offline Web Browsing" The 4th Latin American Web Congress, LA-Web 2006, pp. 15-24.

(Continued)

Primary Examiner — George C Neurauter, Jr.

(57) ABSTRACT

A web application execution method, for a client to execute a web application on a remote server is provided. A connection status between the client and the remote server is monitored. If the connection is established, an online learning process is performed to monitor the handshakes between the client and the server, thereby constructing a virtual server. If the connection is disconnected, an offline service is activated, allowing the client to execute the web application through the virtual server. If the connection is reestablished after being disconnected, a synchronization process is performed to synchronize state machines within the virtual server and the server.

10 Claims, 5 Drawing Sheets

FOREIGN PATENT DOCUMENTS

TW 220741571 11/2007
TW 200826551 6/2008

OTHER PUBLICATIONS

Goncalves, E. et al. "Offline Execution in Workflow-Enabled Web Applications", Proceedings of the 6th International Conference on the Quality of Information and Communications Technology, QUATIC 2007, pp. 204-207.

Nam, K. et al. "A Method for Distributing Web Applications", Proceedings of the 10th International Conference on Advanced Communication Technology, ICAXT 2008, vol. 3, pp. 2179-2182.

* cited by examiner

WEB APPLICATION EXECUTION METHOD

CROSS REFERENCE TO RELATED APPLICATIONS

This application claims priority of Taiwan Patent Application No. 97151203, filed on 29 Dec. 2008, the entirety of which is incorporated by reference herein.

BACKGROUND OF THE INVENTION

1. Field of the Invention

The invention relates to web applications over the internet, and in particular, to a disruption-free web application execution mechanism.

2. Description of the Related Art

A web application is a program providing services through the hyper text transport protocol (HTTP), allowing a client to access services on a remote server over the internet. One field utilizing web applications is mobile communications. For mobile communications, temporarily disconnecting and reconnecting to the internet from a remote service frequently occurs, because a client is usually connected through variable environments where transmission signal quality may be uncertain. Thus, various offline execution methods are proposed to ensure that a remote service can be provided without disruption.

Conventional offline services are mostly implemented by specific modified programs provided by the remote server, wherein offline functions are defined should disconnection occurs, such as defined offline functions provided by Google Gears and Adobe AIR. The disadvantage of the approach is that since the offline functions require a specific modified program to be executed, flexibility for clients is decreased and clients must install the specific modified program for compatibility. Thus, a more compatible mechanism is desirable.

BRIEF SUMMARY OF THE INVENTION

A detailed description is given in the following embodiments with reference to the accompanying drawings.

An exemplary embodiment of a web application execution method is provided, adaptable for a client to execute a web application deployed on a remote server. The connection status between the client and the remote server is observed. If the connection status is online, an online learning process is performed to monitor communication sessions between the client and the remote server to establish a virtual server for providing an offline service. If the connection status is offline, the client is diverted to the virtual server to access the offline service, such that the web application is executed without disruption. If the connection status is returned from being offline to being online, a synchronization process to synchronize execution states of the web application from the virtual server to the remote server is performed.

When performing the online learning process, a request is initiated by the client and recorded, and a response generated by the remote server in response to the request is recorded. The request is analyzed to obtain one or more request parameters. The response is analyzed to obtain a header section and a body section, wherein the header section comprises one or more response parameters, and the body section comprises one or more web resources, structural information and web documents. A resource mapping database is established for recording relationships between the request parameters, the response parameters and the body sections. A resource bank is established for storage of the web resources, the structural information and the web documents.

When the online learning process is performed, relationships between multiple requests and responses generated by the clients and remote server are analyzed to establish a state machine. The virtual server is established based on the resource mapping database, the resource bank, and the state machine. If a response generated by the remote server comprises a declaration file defining offline web sources that are essential for offline operations, the offline web sources defined by the declaration file are fetched to update the resource mapping database and the resource bank.

When the offline service is accessed, a request initiated by the client is diverted to the virtual server. The virtual server analyzes the request to obtain one or more request parameters. The resource mapping database is looked up, based on the request parameters, to obtain one or more response parameters, web resources, structural information, and web documents from the resource bank corresponding to the request parameters. A virtual response is constructed from the one or more response parameters, web resources, structural information, and web documents corresponding to the request parameters, which is then transmitted to the client in response to the request. Furthermore, an HTTP entity tag (Etag) is inserted in the header section of the virtual response to indicate that the virtual response does not need an update. If looking up of the resource mapping database fails to obtain any information corresponding to the request parameters, a link failure message is sent to the client. If a request diverted to the virtual server comprises uploaded data, an upload queue is provided to buffer the request and the uploaded data.

If the connection status is online, but a request initiated by the client meets a criterion for offline execution, the client is diverted to the virtual server to access the offline service.

When performing the synchronization process, the virtual server retransmits one or more requests received when offline to the remote server based on the state machine, such that the execution states of the web application is updated to the remote server. The virtual server may be a software program installed in the client.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the invention, an intermediate interface is provided, such that a web application can be extended to support offline executions without any specific modification of the original program code.

Figure 1:
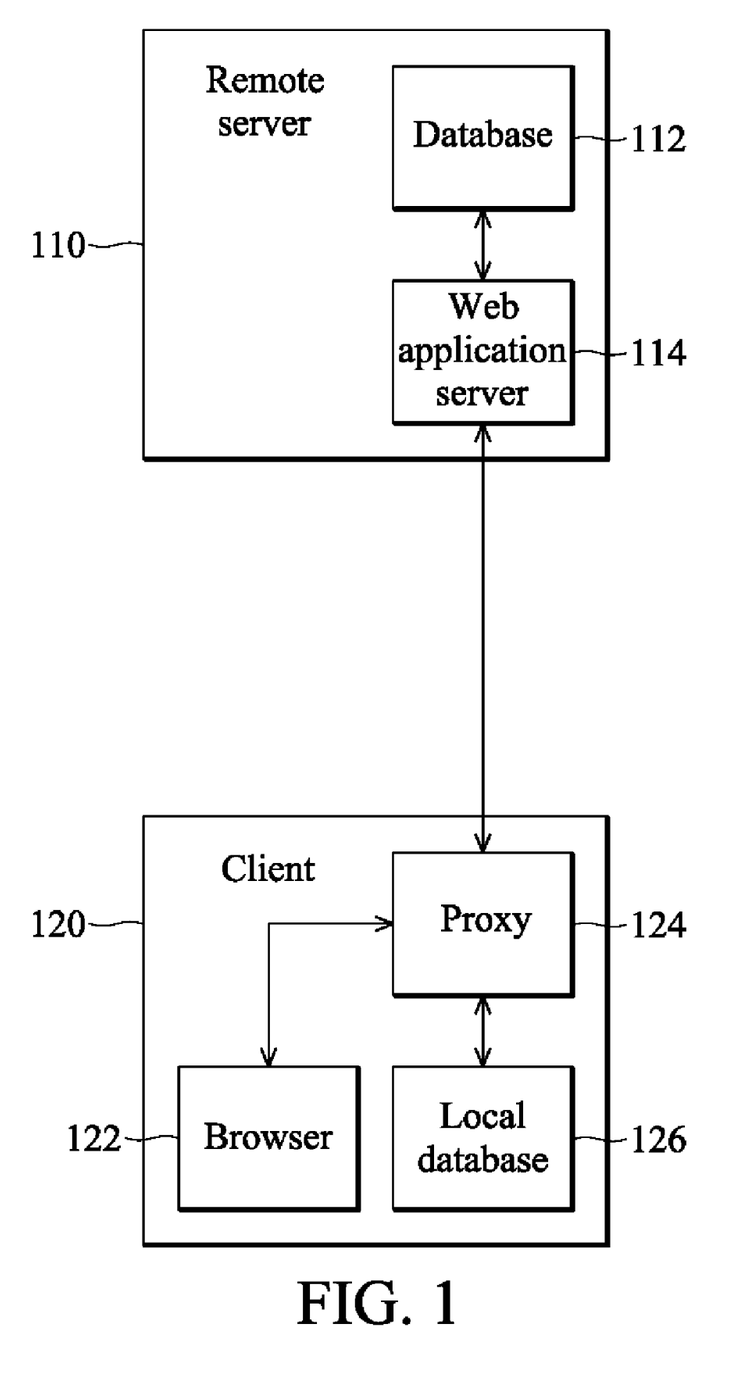
FIG. 1 shows an embodiment of a system structure according to the invention.

FIG. 1 shows an embodiment of a system structure according to the invention. A remote server 110, or a traditional host that provides a web application conforming to the hypertext transport protocol (HTTP), is provided. The remote server 110 comprises a web application server 114 and a database 112. The web application server 114 executes a web application which provides services by generating a response in response to a request initiated from a client 120. The web application may further employ a database 112 at the backend for storage of any uploaded data sent from the client 120. In the embodiment, the web application does not require any modification to support offline executions. The client 120 may be a computer or a mobile phone embedded with a browser 122 that allows the user to interact with the remote server 110. For a typical web application, there are inherently various functions that do not need to be executed online. In the embodiment, a proxy 124 is provided to intercept, monitor, and analyze the handshakes/communications of specific the HTTP layer communication sessions between the browser 122 and the remote server 110, such that the network traffic requirement for the executable functions can be predicted. Furthermore, a virtual server is established by a learning process to simulate various online functions provided by the web application server 114, such that the client is serviced without disruption.

Figure 2:
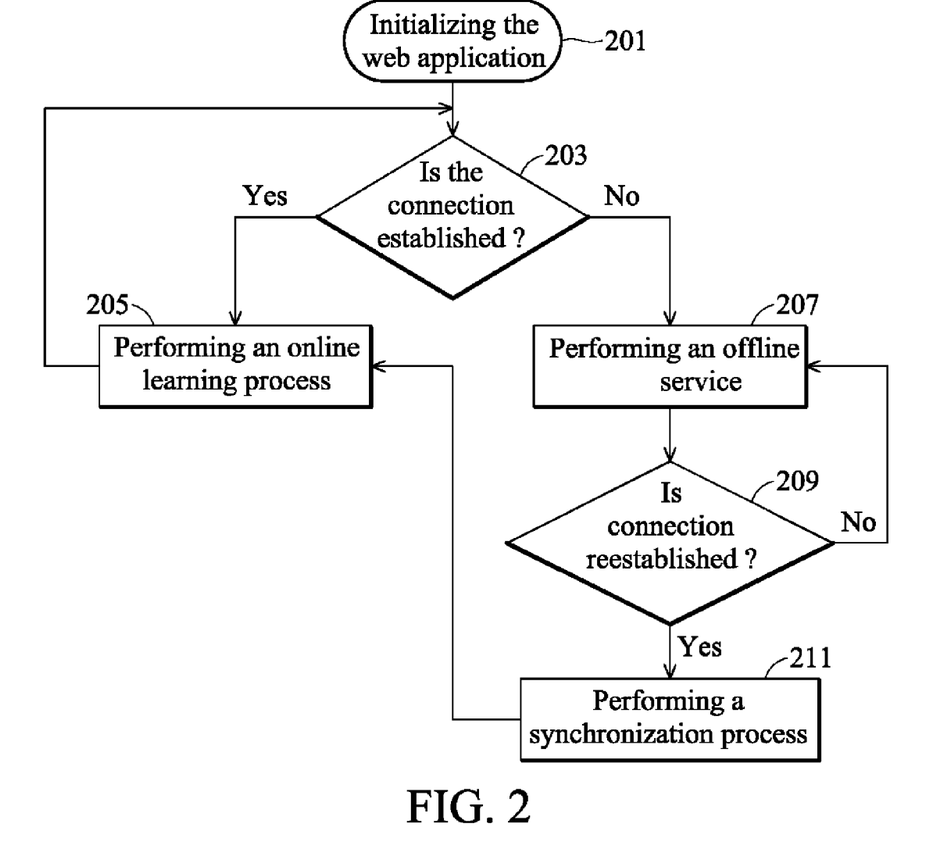
FIG. 2 is a flowchart of the web application execution method according to the invention.

FIG. 2 is a flowchart of the web application execution method according to the invention. The proposed proxy 124 is preferably implemented in the client 120. In step 201, the proxy 124 is initiated to monitor the connection status between the client 120 and the remote server 110, and packets sent to and from the browser 122 and web application server 114. In step 203, the proxy 124 determines whether the connection status is online. If the connection status is online, an online learning process is performed in step 205 to monitor the traffic between the browser 122 and the web application server 114. In this circumstance, the proxy 124 serves as a transparent recorder, wherein the browser 122 and web application server 114 do not recognize its existence, and the execution of the web application is not disrupted or interfered with. The online learning process is designed to establish a virtual server for providing an offline service in case the connection status is disconnected (offline). In step 203, if the proxy 124 detects that the connection status is offline, an offline service is initiated in step 207, allowing the browser 122, without disruption, execute the web application through the proxy 124. In this circumstance, the proxy 124 serves as a virtual server, wherein the web application is a virtual version simulated by the proxy 124, not the original web application from the web application server 114. From the perspective of the browser 122, the service remains uninterrupted by the disconnection status. In step 209, the proxy 124 keeps monitoring the connection status between the remote server 110 and the client 120. If the connection status returns to normal, a synchronization process is performed in step 211 to synchronize the execution states of the web application from the proxy 124 to the remote server 110. Conventionally, there is no need to hold an execution state for a static web page because the content is always the same. For web applications, various functions are provided as a series of operations that follow a complicated workflow, therefore the workflow relationships between various operations are referred to as a state machine. When the web application is executed offline, the interactions between the browser 122 and proxy 124 may cause the state machine to change, such as a logon/logout session states, modification of variables and contents, or uploading of forms and files. Thus, when the connection status returns from being offline to being online, the proxy 124 must replay any state change made by the browser 122 to the web application server 114, and synchronize the modified variables as much as possible, such that the web application server 114 may continue to provide the service without disruption. The synchronization process in step 211 is followed by step 205, when the online learning process is repeated. Next, detailed embodiments of the offline service, the online learning process and the synchronization process are described below.

Figure 3:
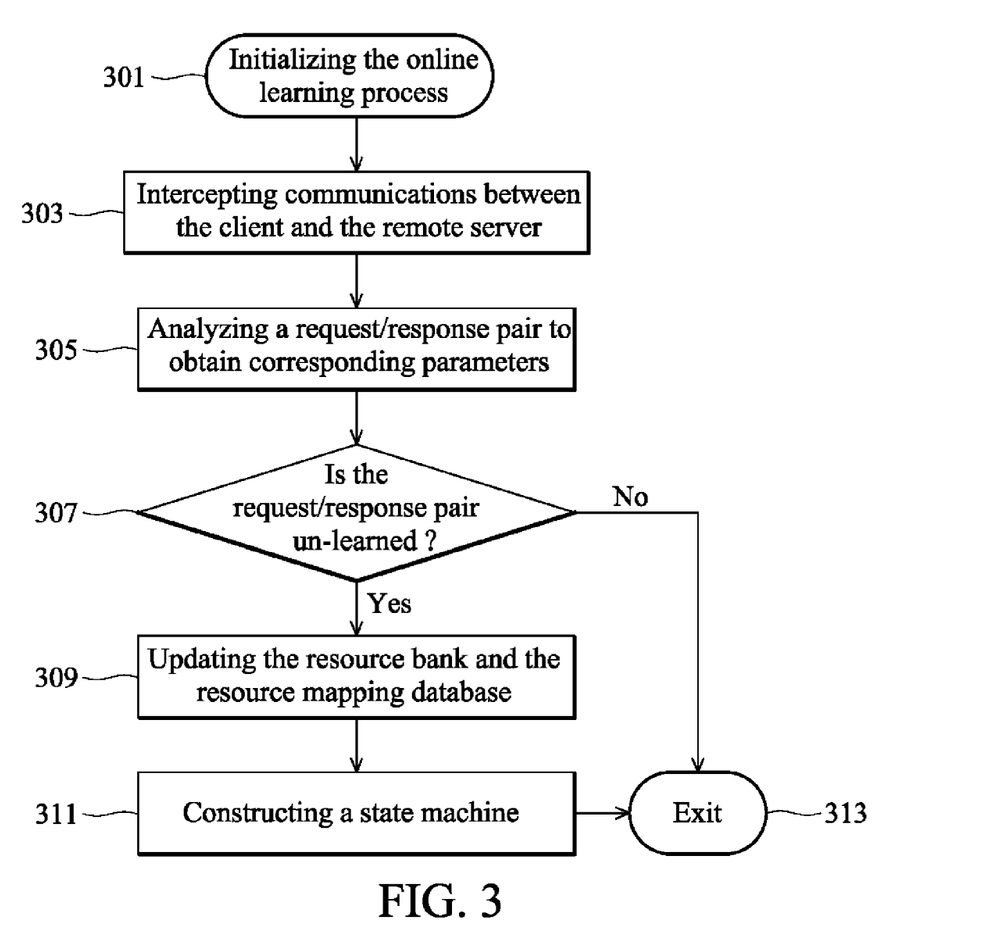
FIG. 3 is a flowchart of an online learning process according to the invention.

FIG. 3 is a flowchart of an online learning process according to the invention. In step 301, the online learning process as described in step 205 of FIG. 2 is initiated. The proxy 124 serves as a transparent recorder invisible to the browser 122 and web application server 114, monitoring the traffic between the browser 122 and web application server 114 without interference. In step 303, the proxy 124 records a request initiated from the browser 122, and a response generated by the web application server 114 in order to response to the request. The request is typically a combination of addresses and parameters, which conforms to the Uniform Resource Locator (URL) standard. The browser 122 may employ certain caching mechanisms such as "cookies" to keep track of the execution states and variables. Thus, a request from the browser 122 may be used to transmit cached data, forms or files to be uploaded to the web application server 114. Each request from the browser 122 is expected to receive a corresponding response from the web application server 114. According to the HTTP standard, the response follows a certain format to present the execution results on the browser 122. A response typically comprises a header section and a body section, and additional codes that are executable by the browser 122 such as Javascript. The header section comprises various tags such as METADATA definition tags of parameters for control of the display effects on the browser 122. The body section may comprise various types of web resources (such as hyper link), structural information (such as markup languages XML), or web documents (such as images, music files, multimedia files and other documents). Since a response has various formations, a MODEL, VIEW and CONTROL (MVC) model is employed to facilitate the analysis of the response. The MODEL defines numeric values that are changeable during the operation of an application. The VIEW defines displayed layouts of an application during the operations. The CONTROL defines program scripts from which the MODEL and VIEW are generated.

In the embodiment, the proxy 124 intercepts and analyzes the communication traffic between the browser 122 and web application server 114 based on the MVC module to establish a virtual server for providing an offline service. In step 305, the proxy 124 analyzes the request to obtain one or more parameters, and analyzes a corresponding response to acquire a header section and a body section. As described, the header section may comprise one or more response parameters (such as METADATA), and the body section may comprise one or more web resources, structural information or web documents. A local database 126 is provided to support the proxy 124 analyzing the requests and responses, whereby a resource mapping database and a resource bank are established therein. The resource mapping database is dedicated to record relationships between each pair of requests and responses. Specifically, one or more request parameters within a request are corresponding to one or more response parameters and the body section within a response. The resource bank is dedicated to store various web resources, structural information and web documents. Generally, different requests may acquire subsequently identical responses with minor differences. The resource bank can detect the redundancy of web resources to avoid capacity reoccupation, and the resource mapping database records the relationships as a basis to rebuild the original pages. Like the proxy 124, the local database 126 is preferably implemented in the client 120.

During the learning process, the requests and responses are analyzed and decoded to be stored in the described resource mapping data base and resource bank. For example, in step 307, when the proxy 124 receives a pair of requests and responses, it looks up the local database 126 to determine whether the pair of requests and responses has already been learned. If it is a new pair, step 309 is performed to analyze the request and response, such that request parameters, response parameters, web resources, structural information and web documents in the body section are extracted to be stored in the local database 126. Otherwise, if the pair has a learned record in the local database 126, the analysis is skipped. Step 309 is followed by step 311. In step 311, relationships between multiple requests initiated by the browser 122 are analyzed. Likewise, relationships between multiple responses generated by the web application server 114 are analyzed, such that a state machine is generated. As discussed, a web application usually has a certain workflow or a series of operation sequences, such as logging on/off, submission of a certain form prior to particular functions, and structural trees of main menus and submenus. Thus, analysis of the state machine helps to rebuild a simulated web application on a virtual server. The proxy 124 then constructs the virtual server based on the resource mapping database, the resource bank and the state machine.

Furthermore, the proxy 124 can also employ conventional approaches to support the construction of a virtual server. For example, if the web application server 114 in the remote server 110 comprises a specific modified program dedicated to provide offline services, such as Google Gears or Adobe AIR, the response would contain a declaration file (Manifest) defining essential web resources required by the offline operations. If the proxy 124 detects the declaration file, the essential web resources defined by the declaration file can further be fetched to the resource mapping database and the resource bank to enhance the offline service.

Figure 4:
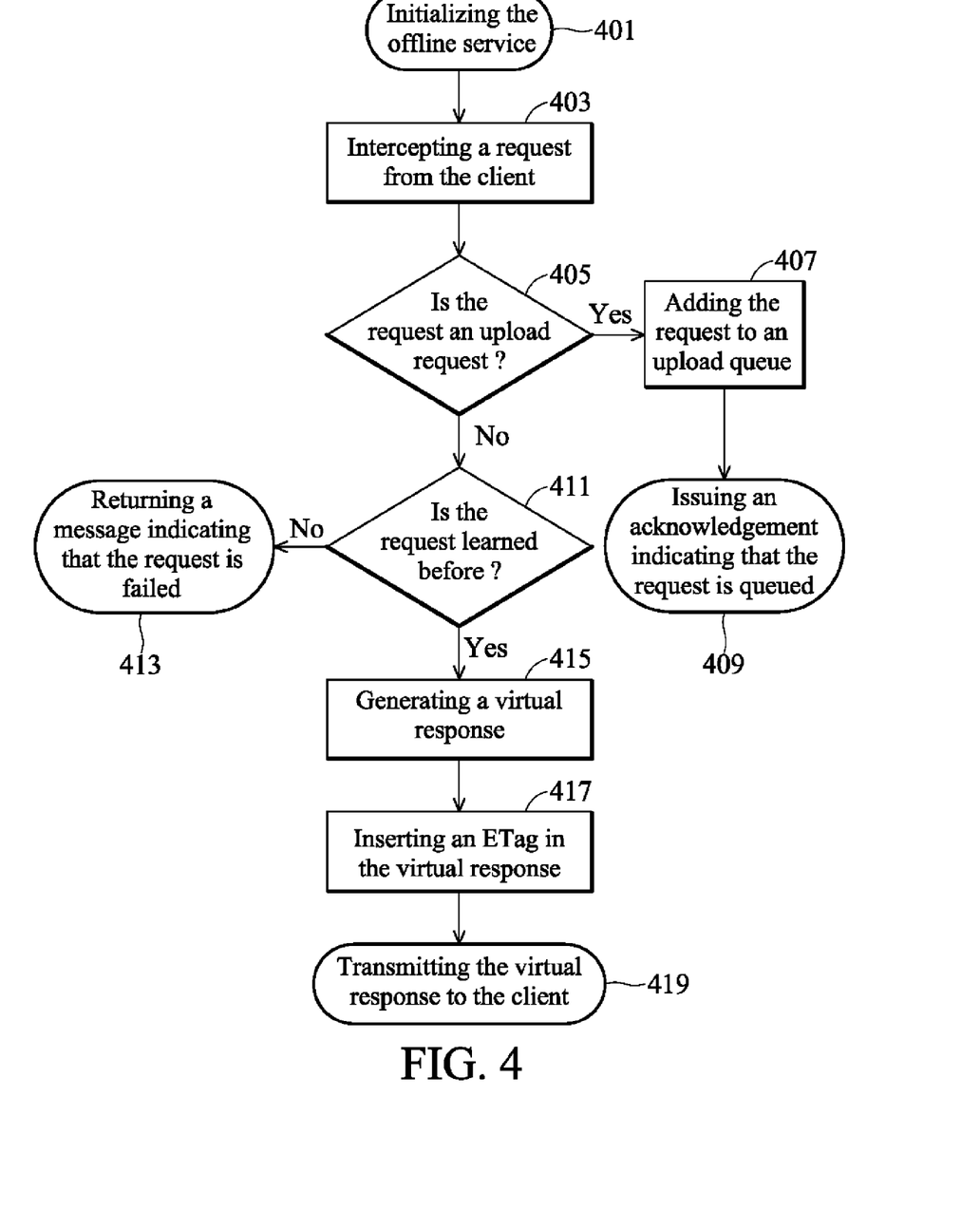
FIG. 4 is a flowchart of an offline service according to the invention.

FIG. 4 is a flowchart of offline services according to the invention. When the connection status is disconnected, the proxy 124 is a virtual server that simulates the web application of the web application server 114 by using the resource bank, resource mapping database and the state machine. In this circumstance, any request issued by the browser 122 would be transparently diverted to the virtual server. In step 401, the offline service as described in FIG. 2 step 207 is initiated. In step 403, the proxy 124 analyzes a request sent from the browser 122 to obtain one or more request parameters. In step 405, it is determined whether the request contains any uploaded files or submission forms. If so, step 407 is performed, whereby an upload queue is provided to buffer the requests and files to be uploaded. The upload queue may be implemented by the local database 126 or other possible solutions for such as temporary data storage or first in first out (FIFO) buffers. Since the files are not actually uploaded to the web application server 114, the proxy 124 may acknowledge a message to the browser 122 in step 409, indicating that the upload operation has been delayed.

If the request is determined to not be an upload operation in step 405, step 411 is performed, in which the resource mapping database in the local database 126 is looked up to determine whether any record corresponding to the request exists. If there is no record in the local database 126, the request is assessed as not being learned during the online learning process. In this case, the proxy 124 issues a message to the browser 122 to indicate that the request has failed in step 413. That is, the offline service provided by the proxy 124 is constrained within the scope of the learned request parameters. Conversely, if a record corresponding to the request is looked up in the local database 126, step 415 is performed, whereby one or more response parameters, web resources, structural information and web documents are acquired from the resource bank to reconstruct a virtual response. Since the virtual response is not real, particular attributes therein may be modified. For example, in step 417, an HTTP Entity Tag (Etag) is inserted into the header section of the virtual response, declaring a status code 304 (Not Modified), such that the browser 122 may stop trying to reload the page from the online connection. Thereafter, in step 419, the proxy 124 transmits the virtual response as a web page to the client.

Figure 5:
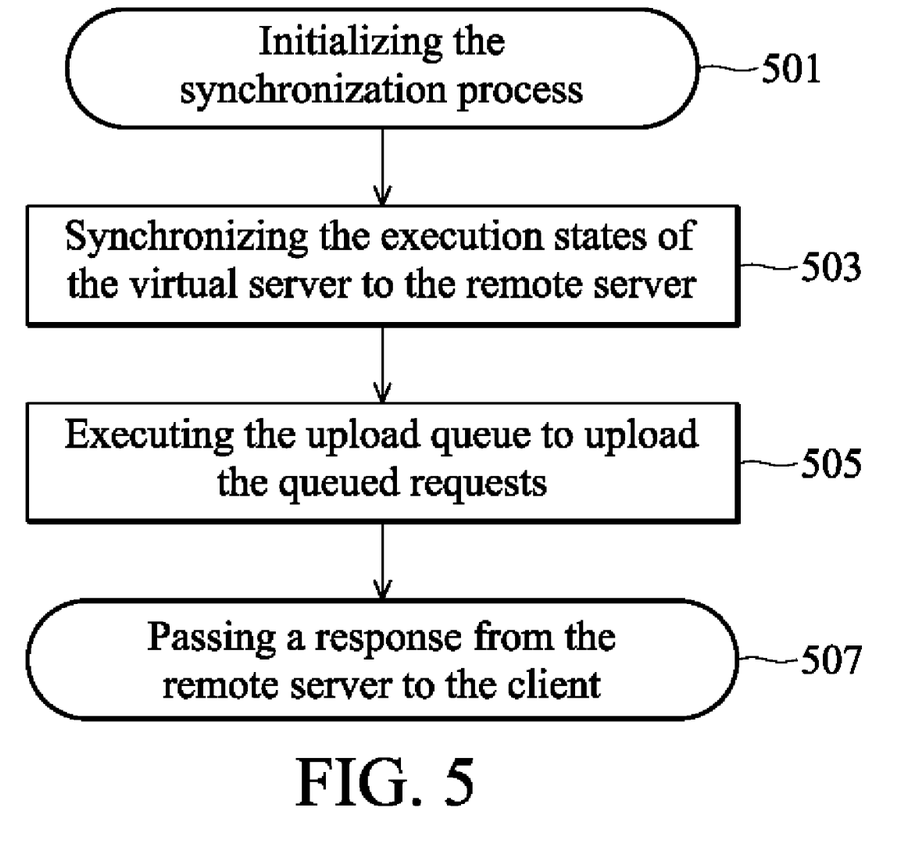
FIG. 5 is a flowchart of the synchronization process according to the invention.

FIG. 5 is a flowchart of the synchronization process according to the invention. As discussed, the execution states of the application may be modified during the offline operations, depending on the logon states or uploaded files. Thus, when the connection status between the client 120 and remote server 110 is restored from being offline to being online, a synchronization process is required. In step 501, a synchronization process as described in step 211 of FIG. 2 is initiated. In step 503, one or more requests received during the offline operations, are retransmitted to the web application server 114 based on the state machine, such that the execution states on the database 112 is synchronous to the virtual server and the browser 122. For example, the proxy 124 may record all requests sent from the browser 122 when offline and replay all of the requests upon reestablishment of the connection. Alternatively, the proxy 124 may selectively replay essential requests that have affected the execution states. If the request is an upload request, step 505 is performed. In step 505, the proxy 124 replays the requests buffered in an upload queue to upload the queued files or submission forms to the web application server 114. Since the synchronization process is performed by replaying the requests sent from the browser 122 when offline, failure may occur if the web application is secured by a time stamp. Thus, in step 507, the response from the remote server 110 is passed to the browser 122 to indicate the replay result. Since the upload queue completely preserves any transactional change made by the user during the offline operations, even if the replaying of the upload requests has failed, the user is able to decide whether to manually retransmit the data stored in the upload queue, so that no information is overlooked.

In summary, the proposed method can transparently support offline web applications without disruption of web application. The proxy 124 serves as an intermediate interface and a virtual server. Resources are collected and analyzed in an online learning process, and are reassembled to simulate the original services when offline. If the web application is specifically modified to support offline execution, the proxy 124 can further interpret the declaration file therein to enhance the offline execution capability. The proxy 124 may be software embedded in the client 120, processing the HTTP layer traffic between the browser 122 and the web application server 114.

Furthermore, the virtual server is not limited to be enabled only when offline. Even if the connection status is online, when the proxy 124 intercepts a request that meets a criterion of offline execution, there is no need to transmit the request to the web application server 114 through the online connection. Instead, the proxy 124 can handle the requests and responses and respond to the browser 122, such that communication efforts such as bandwidth and power consumption can be efficiently reduced. The criterion of offline execution, for example, may be dependent on whether the request has been learned in the resource mapping database.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A web application execution method, adaptable for a client to execute a web application on a remote server, comprising:

observing a connection status between the client and the remote server;

when the connection status is online, processing an online learning process to monitor communication sessions between the client and the remote server to establish a virtual server for providing an offline service;

when the connection status is offline, diverting the client to the virtual server to access the offline service, such that the web application is executed without disruption; and when the connection status is reestablished from an offline connection status, processing a synchronization process to synchronize execution states of the web application from the virtual server to the remote server, wherein the online learning process comprises:

recording a request initiated by the client, and a response generated by the remote server in response to the request;

analyzing the request to obtain one or more request parameters;

analyzing the response to obtain a header section and a body section, wherein the header section comprises one or more response parameters, and the body section comprises one or more web resources, structural information and web documents;

establishing a resource mapping database, for recording relationships between the request parameters, the response parameters and the body sections;

establishing a resource bank for storage of the web resources, the structural information and the web documents;

analyzing relationships between multiple requests initiated by the client and relationships between multiple responses generated by the remote server to establish a state machine; and establishing the virtual server based on the resource mapping database, the resource bank, and the state machine.

2. The web application execution method as claimed in claim 1, wherein the online learning process further comprises:

when a response generated by the remote server comprises a declaration file defining offline web sources that are essential for offline operations, updating the resource mapping database and the resource bank by the offline web sources defined by the declaration file.

3. The web application execution method as claimed in claim 1, wherein the offline service comprises:

diverting a request initiated by the client to the virtual server;

the virtual server analyzing the request to obtain one or more request parameters;

looking up the resource mapping database based on the request parameters, to obtain one or more response parameters, web resources, structural information, and web documents from the resource bank corresponding to the request parameters;

constructing a virtual response from the one or more response parameters, web resources, structural information, and web documents corresponding to the request parameters; and transmitting the virtual response to the client in response to the request.

4. The web application execution method as claimed in claim 3, wherein the offline service further comprises, inserting an HTTP entity tag (Etag) in the header section of the virtual response to indicate that the virtual response does not need an update.

5. The web application execution method as claimed in claim 3, wherein the offline service further comprises, when looking up of the resource mapping database fails to obtain any information corresponding to the request parameters, sending a link failure message to the client.

6. The web application execution method as claimed in claim 3, wherein the offline service further comprises, when a request diverted to the virtual server comprises uploaded data, providing an upload queue to buffer the request and the uploaded data.

7. The web application execution method as claimed in claim 6, further comprising:

when the connection status is online, but a request initiated by the client meets a criterion for offline execution, diverting the client to the virtual server to process the offline service.

8. The web application execution method as claimed in claim 7, wherein the synchronization process comprises, the virtual server transmitting one or more requests received when offline to the remote server based on the state machine, such that the execution states of the web application is consistent with the remote server.

9. The web application execution method as claimed in claim 8, wherein the synchronization process further comprises, transmitting the requests and uploaded data buffered in the upload queue to the remote server.

10. The web application method as claimed in claim 1, wherein the virtual server is a software program installed in the client.

* * * * *